United States Patent [19]

Nakamura

[11] Patent Number: 4,727,798
[45] Date of Patent: Mar. 1, 1988

[54] POPCORN PROCESSING MACHINE

[76] Inventor: Shigeru Nakamura, 15-14, Minami Magome 5-Chome, Oota-Ku, Tokyo-to, Japan

[21] Appl. No.: 933,895

[22] Filed: Nov. 24, 1986

[51] Int. Cl.⁴ .............................................. A23L 1/18
[52] U.S. Cl. .................................... 99/323.9; 99/323.5
[58] Field of Search ................. 99/323.4, 323.5, 323.6, 99/323.7, 323.8, 323.9; 118/19, 24; 426/450

[56] References Cited

U.S. PATENT DOCUMENTS

| | | | |
|---|---|---|---|
| 3,120,168 | 2/1964 | Lippert | 99/323.7 |
| 4,171,667 | 10/1979 | Miller et al. | 99/323.9 |
| 4,182,229 | 1/1980 | Vande Walker | 99/323.7 |

*Primary Examiner*—Timothy F. Simone
*Attorney, Agent, or Firm*—Stevens, Davis, Miller & Mosher

[57] ABSTRACT

A popcorn processing machine has a heating chamber into which a measured quantity of raw corn kernels are fed in each operational cycle to be heated, agitated, and thus popped by only a hot air supplied under pressure as a whirling rising vortex, without the use of an oil, whereby greatly expanded puffs of popcorn of uniform quality are produced in a high yield and in a short processing time. The bottom of the heating chamber can be opened by a simple mechanism, whereby the popped popcorn product can be quickly dumped and the chamber bottom rapidly reclosed, the operational cycle time thereby being extremely short.

5 Claims, 9 Drawing Figures

POPCORN PROCESSING MACHINE

BACKGROUND OF THE INVENTION

This invention relates to improvements in popcorn processing apparatuses which pop popcorn and optionally add flavoring and other additives to the popcorn thus popped.

In a typical popcorn processing machine known heretofore, a receiving dish or pan into which corn kernels are charged is provided above a heat source. At the bottom of this pan, agitator vanes for rotating along the upper surface of the pan bottom are fixedly supported on a vertical shaft. Accordingly, when the vertical shaft is rotated, the vanes rotate within the pan thereby to agitate the raw corn kernels as they are heated by the heat source, whereby the corn kernels are heated and popped into expanded state to fill the interior of the pan.

In such a machine, oil is ordinarily placed in the pan in order to cause the raw corn kernels to pop rapidly. As a consequence of the agitation of the corn kernels, this oil tends to be scattered together with minute particles of the corn against the inner surface of a transparent cover installed for observation around the sides of the pan. The oil and corn particles thus adhere to the glass cover, thereby dirtying the glass and causing it to become opaque. Furthermore, if these contaminants are left in adhering state, they will attract undesirable insects such as cockroaches and are therefore very unhygienic. Since an opaque condition of the glass cover prevents or obstructs observation of the corn popping progress, the contaminants must be frequently wiped off by hand, which is an inconvenient task.

However, if oil is not used in order to prevent this contamination, the time for popping the raw corn becomes disadvantageously long. Furthermore, the construction of the machine itself in this case has been complicated because of the necessity of providing rotational support means and driving means for the agitator vanes.

SUMMARY OF THE INVENTION

It is an object of this invention in one aspect thereof to provide a popcorn processing machine which is capable of heating and popping raw corn rapidly without addition of oil to produce large popcorn puffs in a uniform manner, and in which contamination of the machine arising from the use of oil does not occur.

Another object of the invention in another aspect thereof is to provide a popcorn processing machine in which popcorn which has been popped in a heating chamber is discharged immediately downward without any scattering, spilling, or sticking, and, by recharging raw corn into the empty heating vessel, the corn heating and popping step can be performed rapidly thereby to shorten the operational cycle time.

According to this invention, briefly summarized, there is provided a popcorn processing machine comprising: heating chamber means for heating and popping corn kernels fed thereinto; a heating basked constituting the bottom of the heating chamber and having a plurality of louver-like slots; means for supplying hot air under positive pressure through said slots and upward into the heating chamber, said slots being so formed as to direct said hot air as a vigorously whirling stream in the heating chamber thereby to agitate, heat, and thereby pop said corn kernels in said heating chamber; means for feeding a metered quantity of raw corn kernels into the heating chamber; and dumping means operable by drive means to open the bottom of the heating chamber after the corn kernels have been popped thereby to dump the popcorn thus popped into a receiving structure and to close said bottom thereafter.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

Figure 1:
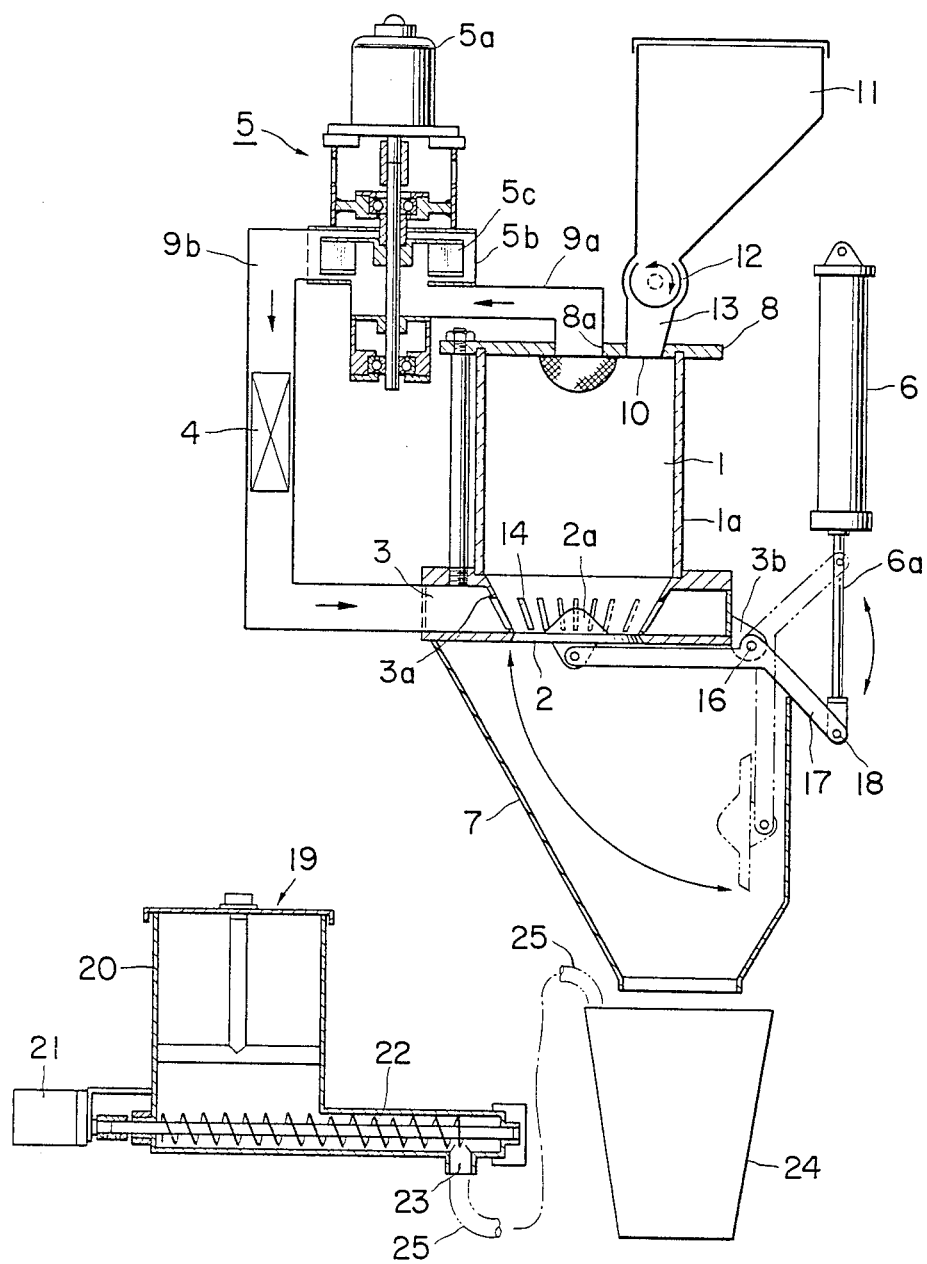
FIG. 1 is a side elevation, with most parts shown in vertical section, showing essential parts and arrangement thereof of one embodiment of the popcorn processing machine according to this invention.
Figure 2:
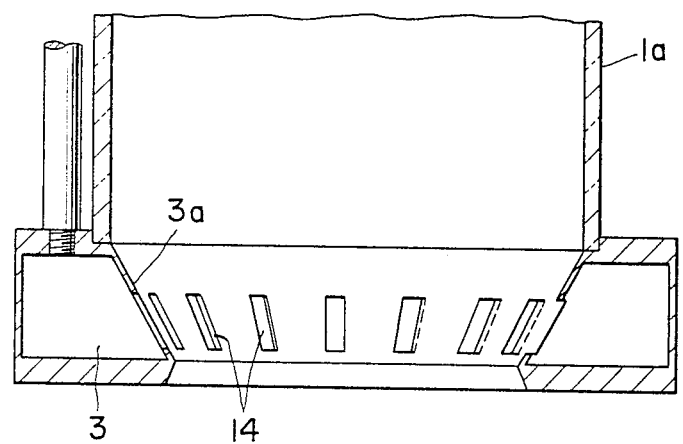
FIGS. 2 and 3 are in elevation, in vertical section, and a half plan view of the parts at the lower part of a heating chamber in the same machine.

In one embodiment of the popcorn processing machine according to this invention in the form of an automatic popcorn vending machine, as illustrated in FIG. 1, an essential component thereof is a heating chamber 1, in which popcorn kernels are heated and popped. The bottom of this heating chamber 1 is formed by a heating basket 3a having an open bottom and surrounded by a hot air injection header or chamber 3. The basket 3a has a downwardly converging conical side wall. The bottoms of the hot air injection chamber 3 and the heating basket 3a are formed by a combined heating tray/dumper 2. The top of the heating chamber 1 is closed by a cover plate 8.

An air circulater 5 installed outside of the heating chamber 1 draws air from the interior of the chamber 1 through a hole 8a in the cover plate 8 and through an outflow duct 9a and returns the air through a return duct 9b into the hot air injection chamber 3. A heat source 4 is installed in the return duct 9b to heat the air entering the hot air injection chamber 3 and being injected into the heating basket 3a and the heating chamber 1 through slots formed in the basket 3a. The heating tray/dumper 2 is pivotally supported by a pivot pin 16 and is thus swingable downward to open the bottom of the heating basket 3a. This heating tray/dumper 2 is actuated to undergo its opening and closing swinging movements by drive means 6, such as a pneumatic cylinder, via an actuator rod 6a and a lever 17 and is enclosed by a product hopper 7.

The structure forming the heating chamber 1 is supported by a machine frame (not shown) and has a peripheral side wall in the form of a transparent window 1a. As described hereinbefore, the top of this structure 1 is covered by the heating chamber cover plate 8, in which a raw corn inlet 10 is formed. Above this inlet 10 is installed a raw corn hopper 11 connected at its constricted bottom outlet to a metering feeder 12, the outlet of which is connected by a passage 13 to the raw corn inlet 10.

The metering feeder 12 in this embodiment is of a rotary type adapted to open and close flow through the passage 13. When this metering feeder 12 rotates through one revolution, a specific quantity of the raw corn kernels supplied into the corn hopper 11 is fed into the heating chamber 1, and upon completion of this feeding action, the metering feeder 12 closes the passage 13.

The method and means for metering and feeding the raw corn kernels are not limited to those described above but may be any other suitable forms.

Figure 3:
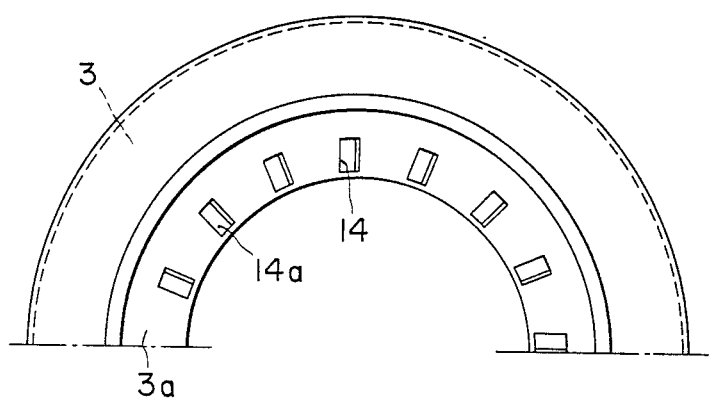
Figure 4:
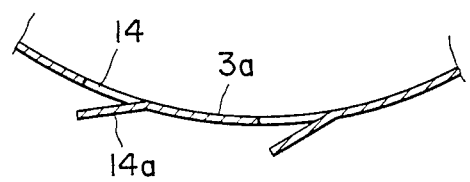
FIG. 4 is a fragmentary sectional view showing louver-like slots with fins, a large number of which are formed in a heating basket at the bottom of the heating chamber.

The aforedescribed heating basket 3a is of inverted frustoconical shape and is provided with a large number of slots 14 extending in the direction of the elements thereof as shown in FIGS. 3 and 4. Each of the slots 14 is a louver-like slotted aperture with a longitudinal slot or fin 14a, which is bent and so orientated that the hot air under pressure being injected into the hot air injection chamber 3 will be caused to flow tangentially relative to the peripheral circle of the heating tray/dumper 2. Thus, each slot 14 and its fin 14a form a hot air injection nozzle of elongated shape. These nozzles function in combination to cause the injected hot air to agitate and waft the corn kernels as these kernels are simultaneously heated to popping state by the blast of this hot air thus injected. In order to aid and increase the effectiveness of this agitation and heating action, the center of the heating tray/dumper 2 is bulged upward in the shape of a conical mound 2a.

The aforementioned heat source 4 in this embodiment is a two-stage air heater comprising first and second stages installed in tandem in the duct 9b. The first stage preheats the circulating air to a temperature of approximately 180° to 200° C., while the second stage operates to additionally heat the air, the two stages being set to raise the air to a final temperature of approximately 230° C.

The aforementioned air circulator 5 installed outside of the heating chamber 1 comprises essentially a blower casing 5b, a blower impeller 5c rotatably supported within the blower casing 5b, and a blower motor 5a for driving the impeller 5c. The downstream end of the aforementioned outflow duct 9a is connected to the central inlet part of the blower casing 5b, and the upstream end of the return duct 9b is connected to the outlet of the blower casing 5b. As described hereinabove, the return duct 9b is provided therein with the first and second stages of the heat source 4. As a result, when the air circulator 5 operates in conjunction with the heat source 4, hot air at a specific temperature of approximately 230° C. is supplied under positive pressure into the hot air injection chamber 3 and is thereby injected into the heating basket 3a as a whirling hot air current, being thus directed by the fins 14a of the slots 14.

Figure 5:
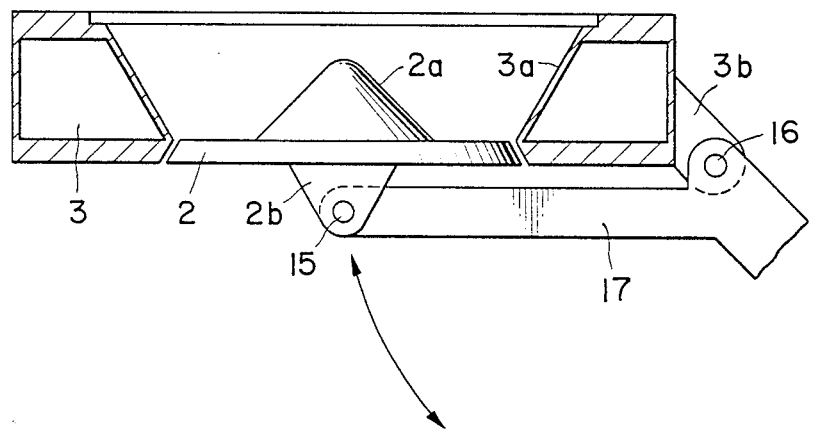
FIG. 5 is a side elevation, in vertical section, of parts at the lower part of the heating chamber, particularly a dumping means.
Figure 6:
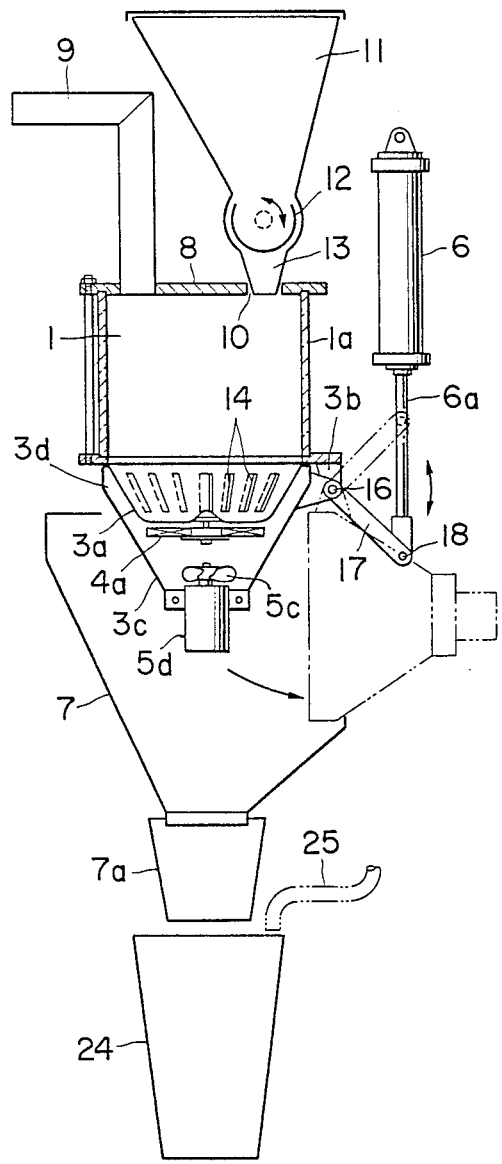
FIG. 6 is a side elevation, with most parts in vertical section, showing essential parts and arrangement thereof of another embodiment of the machine of the invention.

As shown in FIG. 5, the heating tray/dumper 2 is supported by way of a bracket 2b fixed to the lower surface thereof and a pin 15 on the outer end of one arm of a lever 17, which is pivotally supported at an intermediate point thereof by a pin 16 on a bracket 3b fixed to the enclosure of the hot air injection chamber 3. The other end of the lever 17 is pin connected, as shown in FIG. 1, by a pin 18 to the outer end of the actuator rod 6a of the aforementioned drive means 6.

In closed state of the heating tray/dumper 2, the lever 17 is in its angular position shown by solid line and thus maintained by the outwardly extended state of the actuator rod 6a of the drive means 6. Thus, when the drive means 6 is operated to retract its actuator rod 6a, the lever 17 is rotated counterclockwise about the pivot pin 16 to its position as indicated by two-dot chain line, whereby the heating tray/dumper 2 is swung downward to its dumping state.

For imparting flavor to the popped popcorn in a receptacle 24 placed below the product hopper 7, a feeder 19 for feeding flavoring in powder form as illustrated in FIG. 1 is provided. This feeder 19 comprises a flavoring reservoir 20, a screw conveyor 22 for feeding flavoring from the bottom of the flavoring reservoir 20 to an outlet 23, a motor 21 for driving the screw conveyor 22, and a conducting means such as a pipe 25 for conducting the flavoring thus fed and discharged from the outlet 23 to and into the receptacle 24.

The operation of the popcorn processing machine of the above described construction is as follows. First, the raw corn hopper 11 is filled with raw corn kernels. The blower motor 5a of the air circulator 5 is started to start the air circulation, and the heat source 4 is started to deliver hot air into the heating chamber 1 through the hot air injection chamber 3 and the heating basket 3a. Then, when the metering feeder 12 is rotated through one revolution, a specific quantity of the raw corn kernels is fed from the raw corn hopper 11 into the heating chamber 1, whereupon the corn kernels are agitated in whirling motion by the hot air entering the heating basket 3a as described hereinbefore and at the same time are heated by the hot air, thereby being popped after a certain short time. The air which has completed its part of the above described function reaches the upper part of the heating chamber 1 and is exhausted through the outflow duct 9a to be recirculated by the air circulator 5.

The corn kernels are heated and popped in the above described manner in a short time of the order of 50 to 60 sec. Moreover, since no oil is used, the kernels are popped into large, fluffy white popcorn balls in a high yield, that is, with almost all raw corn kernels being positively popped. Another noteworthy feature of this invention is that this corn popping operation is thus accomplished in a short time without the use of an oil by the agitating whirling and wafting action of only the hot air without the use of a mechanical agitator such as agitating vanes.

Upon completion of the above described operation, the drive means 6 is operated, whereby its actuating rod 6a thereof is retracted to cause the heating tray/dumper 2 to swing down about the pivot pin 16 thereby to dump the popped popcorn into the product hopper 7, from which the popcorn is dropped into a receiving vessel 24 such as a cup.

At this instant, the motor 21 of the flavoring feeder 19 is operated thereby to feed a metered quantity of flavoring from the flavoring reservoir 20 by means of the screw conveyor 22 through the outlet 23 and the conducting means 25 into the vessel 24. In the case where corn kernels which have been flavored beforehand are used as the starting raw corn, however, it is not necessary to use the flavoring feeder 19.

After the popped popcorn has been discharged in the above described manner, the drive means 6 is operated in reverse direction thereby to swing the heating tray/dumper 2 upward into closed position against the bottom of the heating basket 3a. At the same time, the second stage of the heat source 4 is turned off, whereupon the machine is placed in a state of readiness for a succeeding cycle of corn popping and discharging operation.

The above described sequential actions in one cycle of operation of the metering feeder 12, the blower motor 5a of the air circulator 5, the first and second stages of the heat source 4, and the drive means 6 for actuating the heating tray/dumper 2 can all be controlled manually or they can be controlled automatically in appropriately timed sequence by known automatic control means (not shown). In the case where the machine is used for continuous operation of a repeated series of the above described cycle, means are provided for feeding raw corn kernels into the raw corn hopper 11, and means are provided for conveying a successive plurality of the receiving vessels 24, which in this case are each in the form of an open and unsealed packaging receptacle. When the machine is applied to an automatic popcorn vending machine, each operational cycle is automatically carried out by known control means in response to receipt and confirmation of the prescribed monetary amount paid into the vending machine by the purchaser.

This invention has been described above with respect to one embodiment thereof wherein the heat source 4 comprises two stages, the first of which is constantly operating in a preheating state, while the second stage operates to heat the circulating air when raw corn kernels have been charged into the heating chamber 1. This arrangement affords a short popcorn processing time and high production efficiency, but the invention is not necessarily limited to the provision of two heating stages in the heat source.

Another embodiment of this invention is illustrated in FIGS. 6 through 9, in which those parts which are the same or equivalent to corresponding parts in the preceding embodiment shown in FIGS. 1 through 5 are designated by like reference numerals. Detailed description of such parts will not be repeated.

The principal difference between the instant embodiment and the preceding embodiment is that, in the instant embodiment shown in FIGS. 6 through 9, hot air is produced by a heat source 4a disposed directly below the heating basket 3a, is blown upward by fan blades 5c driven by a motor 5d disposed below the heat source 4a to flow upward through the heating basket 3a and the heating chamber 1, thereby heating and popping corn kernels, and is thereafter discharged out at the upper part of the heating chamber 1 through a duct 9 to the outside air. Thus, the hot air is not circulated.

Figure 7:
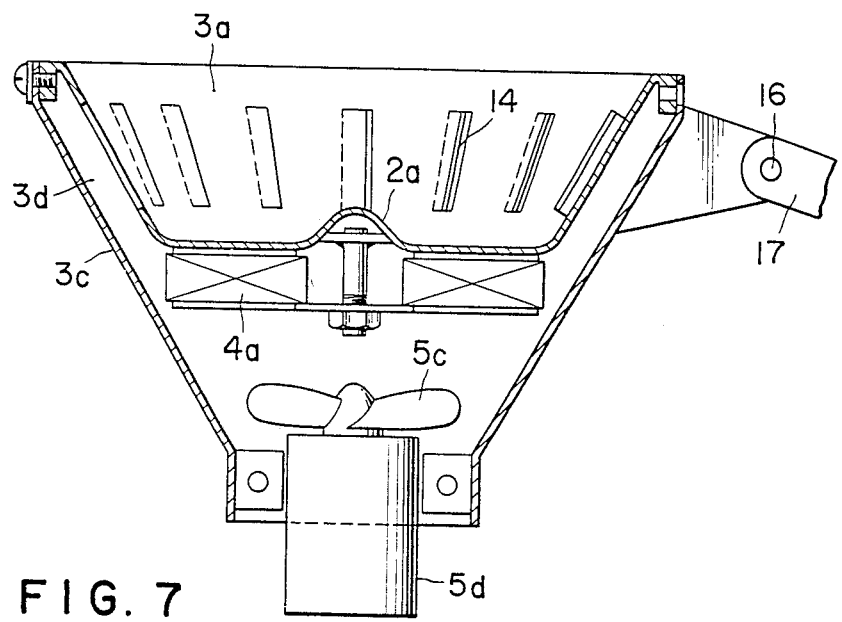
FIG. 7 is a side elevation in vertical section showing a unitarily combined assembly of parts constituting a dumping means.

Another different feature is the manner in which the bottom of the heating chamber 1 is closed for heating and then opened for dumping the popped corn into the product hopper 7. Instead of the heating tray/dumper 2 used in the first embodiment to close the open bottom of the heating basket 3a, an integral assembly as shown in FIG. 7 is used to close the open bottom of the heating chamber 1. This assembly comprises a frustoconical frame 3c serving as an air flow guide or duct, the heating basket 3a supported at its upper periphery on the upper side rim of the frame 3c so as to define an annular space 3d, the heat source 4a supported in suspended state from the bottom of the heating basket 3a, the motor 5d supported with vertical rotor axis by the narrower bottom end of the frame 3c, and the fan blades 5c supported on the rotor shaft of the motor 5d and disposed below the heat source 4a within the frame 3c.

The frame 3c is fixed at an upper part thereof to one end of the lever 17, which, as in the first embodiment, is pivotally supported at an intermediate part thereof by the pivot pin 16 on the bracket 3b and is connected at its other end by a pin 18 to the outer end of the actuator rod 6a of the drive means 6. Thus, the entire assembly shown in FIG. 7 is swingable in opening and closing movement by the retraction and extension of the actuator rod 6a.

Figure 8:
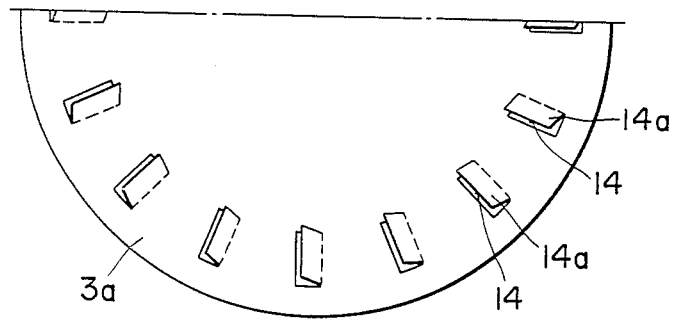
FIG. 8 is a half plan view of a heating basket in the assembly shown in FIG. 7.
Figure 9:
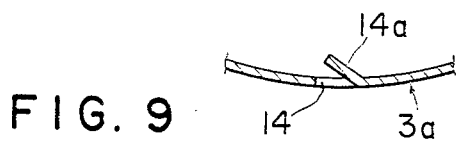
FIG. 9 is a fragmentary sectional view showing one of the numerous slots with fins formed in the heating basket shown in FIG. 8.

The heating basket 3a in this second embodiment is also provided with numerous slots 14, each of which is a louver-like slotted aperture with a longitudinal fin 14a formed from the stamping of the slot 14 as shown in FIGS. 8 and 9. The fins 14a in this embodiment, however, are bent radially inward instead of outward as in the first embodiment.

In other respects, including its operation, this embodiment of the popcorn processing machine is basically and essentially the same as the preceding first embodiment. Air is caused to flow through the heat source 4a and made into hot air, which flows through the space 3d and the slots 14 into the heating chamber 1.

In the case where the popcorn processing machine of this invention, as described above with respect to two embodiments thereof, is applied to an automatic popcorn vending machine, it is installed within an outer cabinet or housing (not shown) preferably with a transparent wall at its front half in the upper half part thereof. The front half part of this housing is preferably made openable so as to facilitate work such as cleaning, inspection, repairing, and resupplying of raw corn kernels and other materials. Still another preferred feature is the provision of means for facilitating such work with respect to the rear part of the machine.

As a result of experimental testing, I have found that, by the use of the popcorn processing machine according to this invention, corn kernels can be popped to a very high degree of expansion, whereby the yield in terms of volumetric bulk of the popped product can be made considerably higher than that attainable by means of a conventional machine for the same raw corn kernels.

As described above with respect to preferred embodiments thereof, this invention provides a popcorn processing machine in which corn kernels fed in metered quantity into the heating chamber are heated, agitated, and thereby popped by the action of only hot air entering the heating chamber as a whirling vortex. As a result, the processing time is considerably shortened in comparison with that in a conventional corn popping machine with a mechanical agitator. Furthermore, since there is no necessity of using an oil, there is less possibility of burning of some kernel. Moreover, this corn popping process affords uniform processing with good drying condition, whereby large fluffy popcorn puffs are uniformly produced without burnt kernels and in a high yield without unpopped kernels or cracked grains.

As mentioned hereinbefore, another advantage of the invention is that, since oil is not used in the heating and popping process, there is almost no contamination of parts such as the transparent observation wall of the heating chamber, and any small quantity of minute corn particles which may accompany the corn is swept and dumped out together with the popcorn product.

Furthermore, the construction of the entire machine of this invention is simple because of the above mentioned absence of a mechanical agitator and the adoption of a simple product dumping mechanism, which also contributes to shortening of the operational cycle time.

What is claimed is:

1. A popcorn processing machine comprising:
   a heating chamber for heating and popping corn kernels fed thereinto;
   a heating basket forming the bottom of the heating chamber and having a plurality of louver-like slots, the heating basket being fixedly supported relative to the structure defining the heating chamber, and surrounded around the lateral wall thereof by a hot air injection chamber, the heating basket having an openable bottom which is closed for heating by a heating tray serving doubly as a dumper;
   means for supplying hot air under positive pressure through said slots and upward into the heating chamber, said slots being so formed as to direct said hot air as a vigorously whirling stream in the heating chamber thereby to agitate, heat, and pop said corn kernels in said heating chamber, said means for supplying hot air comprising air circulating means for drawing air from the heating chamber and returning said air via a duct into said hot air injection chamber and air heating means installed within said duct;
   means for feeding a metered quantity of raw corn kernels into the heating chamber; and
   dumping means operable by drive means to open the bottom of the heating chamber after the corn kernels have been popped thereby to dump the popcorn thus popped into a receiving structure and to close said bottom thereafter, said dumping means comprising said heating tray, said drive means, and a transmission mechanism for transmitting driving movement from said drive means to the heating tray.

2. A popcorn processing machine comprising:
   a heating chamber for heating and popping corn kernels fed thereinto;
   a heating basket forming the bottom of the heating chamber and having a plurality of louver-like slots;
   means for supplying hot air under positive pressure through said slots and upward into the heating chamber, said slots being so formed as to direct said hot air as a vigorously whirling stream in the heating chamber thereby to agitate, heat, and pop said corn kernels in said heating chamber; said means for supplying hot air comprising air heating means disposed below said heating basket, an air blower disposed below said air heating means and powered by motive power means to blow air upward through and past said air heating means, said air thereby being heated and supplied, through said slots of the heating basket into the heating chamber, and a frame disposed below the heating basket and functioning as a duct for guiding the air thus blown and heated, the hot air, after functioning to agitate, heat and pop the corn kernels, being exhausted from the heating chamber through an outlet at the upper part thereof;
   means for feeding a metered quantity of raw corn kernels into the heating chamber; and
   dumping means operable by drive means to open the bottom of the heating chamber after the corn kernels have been popped thereby to dump the popcorn thus popped into a receiving structure and to close said bottom thereafter.

3. A popcorn processing machine according to claim 2 wherein said dumping means comprises a unitarily combined assembly of said heating basket, said air heating means, said air blower, and said frame, said drive means, and a transmission mechanism for transmitting driving movement from said drive means to the heating tray.

4. A popcorn processing machine according to claim 3 wherein said air heating means is attached to the bottom of the heating basket, and said heating basket and said frame are each of a downwardly converging conical shape, said air blower being fixed at the bottom of the frame.

5. A popcorn processing machine according to claim 2 wherein said heating basket has a bottom bulged upward at the center thereof in the shape of a conical mound.

* * * * *